United States Patent [19]
Norkey

[11] Patent Number: 5,310,226
[45] Date of Patent: May 10, 1994

[54] QUICK CONNECT COUPLING FOR A FUEL TANK

[75] Inventor: Phillip J. Norkey, Jackson, Mich.

[73] Assignee: Pilot Industries, Inc., Dexter, Mich.

[21] Appl. No.: 33,354

[22] Filed: Mar. 18, 1993

[51] Int. Cl.⁵ .......................................... F16L 37/084
[52] U.S. Cl. ..................................... 285/316; 285/423
[58] Field of Search ............... 285/315, 316, 317, 84, 285/423; 141/382, 383

[56] References Cited

U.S. PATENT DOCUMENTS

| | | | |
|---|---|---|---|
| 3,195,935 | 7/1965 | Beebee | 285/316 |
| 3,351,363 | 11/1967 | Downey et al. | 285/316 X |
| 3,352,576 | 11/1967 | Thomsen | 285/316 X |
| 3,439,943 | 4/1969 | Thomsen | 285/316 |
| 3,761,117 | 9/1973 | Shendure . | |
| 3,836,114 | 9/1974 | Norton et al. . | |
| 4,462,620 | 7/1984 | Babenek et al. . | |
| 4,610,284 | 9/1986 | Bartholoma . | |
| 4,660,803 | 4/1987 | Johnston | 285/315 X |
| 4,681,350 | 7/1987 | Gaita | 285/316 X |
| 4,776,614 | 10/1988 | Marrison et al. . | |
| 4,828,296 | 5/1989 | Medrick | 285/316 X |
| 5,111,858 | 5/1992 | Aittama | 141/382 |
| 5,116,086 | 5/1992 | Psajd . | |
| 5,120,085 | 6/1992 | Shin | 285/317 |

FOREIGN PATENT DOCUMENTS 1066637 4/1967 United Kingdom ............... 285/316

Primary Examiner—Dave W. Arola
Attorney, Agent, or Firm—Gifford, Groh, Sprinkle, Patmore and Anderson

[57] ABSTRACT

A quick connect fluid coupling is provided for use with a fuel tank having an outwardly extending tubular and cylindrical nipple and which the nipple has a radially inwardly extending recess at a position spaced from its outer end. The coupling includes a tubular and cylindrical body which is open at each end and which is dimensioned to slidably extend over the nipple to a connected position. The body includes a plurality of elongated and circumferentially spaced slots formed radially through the body and these slots register with the nipple recess when the body is in its connected position. An elongated arcuate retainer is positioned within each slot and is radially movable between an inner locked position in which a portion of the retainer is positioned in the nipple recess, and an outer unlocked position in which the retainers are positioned outside the nipple recess thereby allowing the body to move axially with respect to the fuel tank nipple. A tubular and cylindrical locking ring is positioned coaxially around the body and is movable between an extended and a retracted position. The locked ring includes an inner cam surface which radially moves the retainers from their unlocked position to their locked position as the locking ring is moved from its retracted to its extended position.

5 Claims, 2 Drawing Sheets

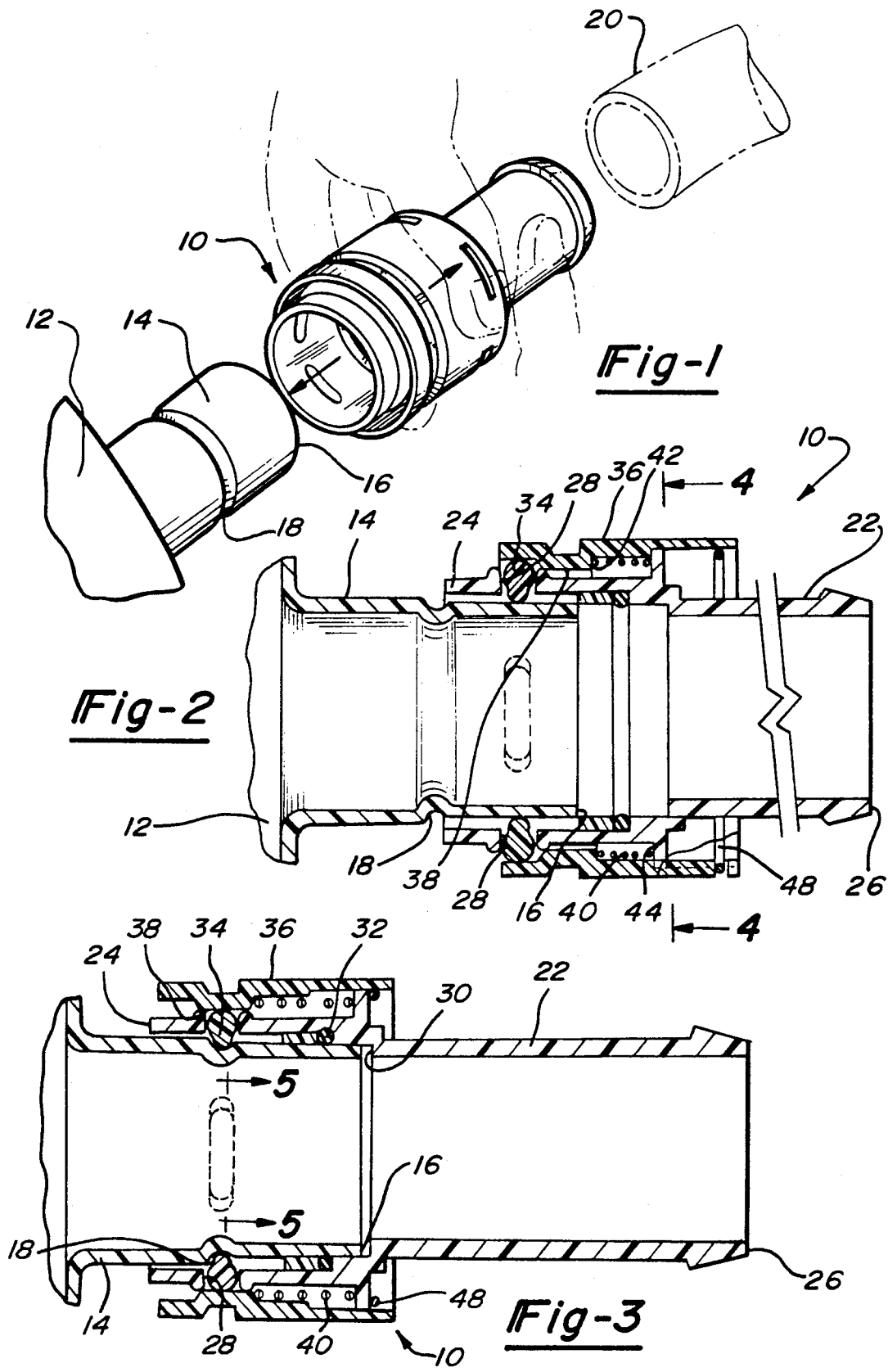

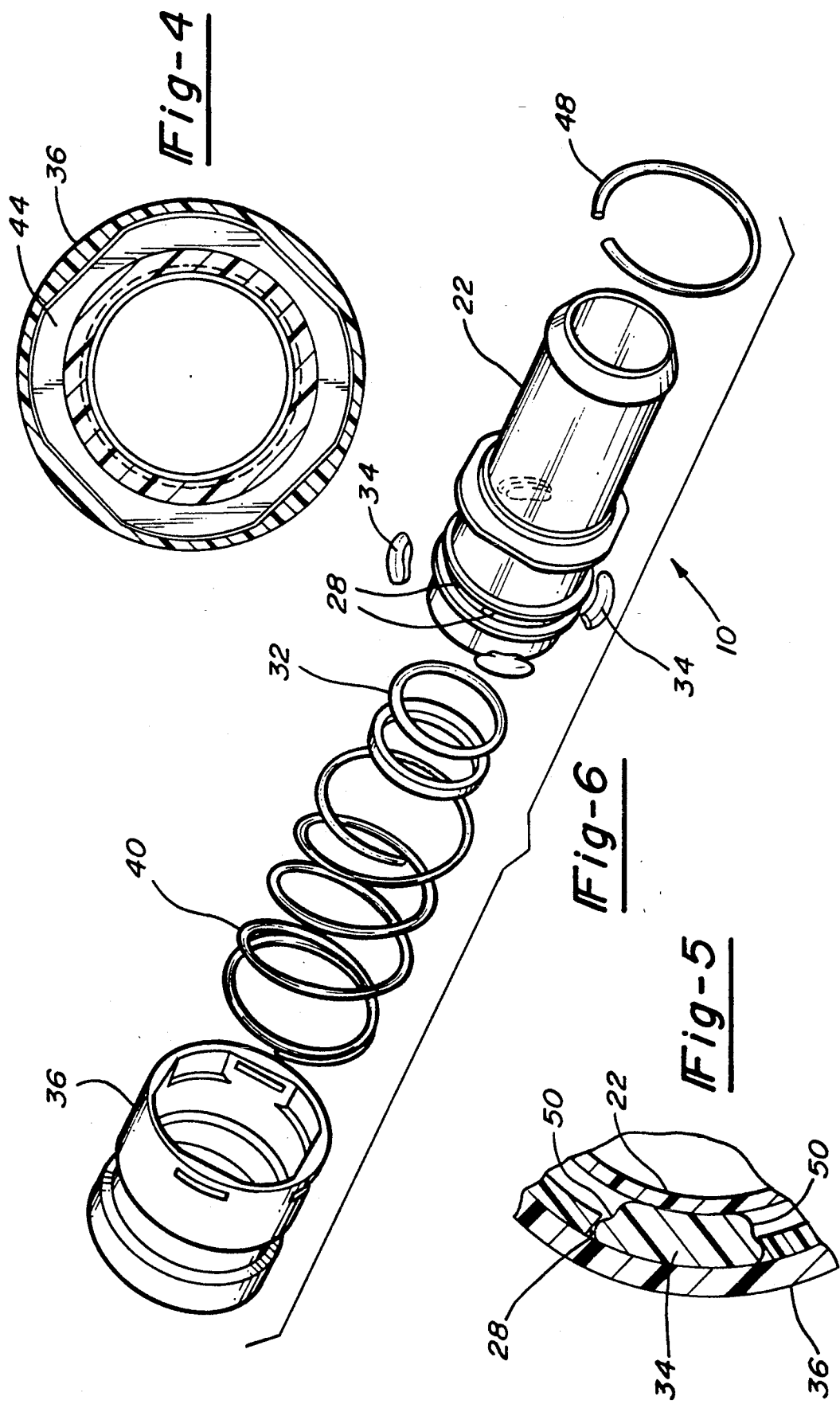

QUICK CONNECT COUPLING FOR A FUEL TANK

BACKGROUND OF THE INVENTION

I. Field of the Invention

The present invention relates generally to fluid coupling and, more particularly, to a quick connect fluid coupling for a fuel tank.

II. Description of the Prior Art

Fuel tanks of the type used on automotive vehicles typically include an outwardly extending nipple which is fluidly connected with the fill tube for the automotive vehicle. The fill tube is then used to fill the fuel tank in the conventional fashion.

Although there have been a number of previously known ways for attaching the fill tube to the fuel tank nipple, all of these previously known attachment methods require assembly time on the automotive assembly line. This necessarily increases the overall labor cost of the vehicle.

A still further disadvantage of these previously known fuel tanks and fill tubes is that access between the fuel tank nipple and the fuel tube is limited on many automotive vehicles. This further increases the difficulty and time required to connect the fuel tube to the fuel tank nipple thus further increasing assembly time and vehicle cost.

SUMMARY OF THE PRESENT INVENTION

The present invention provides a quick connect fluid coupling for use with a fuel tank which overcomes all of the above mentioned disadvantages of the previously known devices.

In brief, the quick connect coupling of the present invention comprises a tubular and cylindrical housing which is open at each end and is dimensioned to slidably extend over the nipple to a connected position. The housing also includes a plurality of elongated and circumferentially spaced slots formed radially through the body and these slots register with the nipple recess when the body is in its connected position.

An elongated arcuate retainer is positioned within each of the body slots. These retainers are radially movable with respect to the body between an inner locked position and an outer unlocked position. In its inner locked position, a portion of each retainer is positioned within the fuel tank nipple recess thus preventing axial movement of the body with respect to the fuel tank nipple. Conversely, in their radially outer or unlocked position, the retainers are spaced outwardly from the nipple recess thus allowing the body to axially slide with respect to the fuel tank nipple.

A tubular and cylindrical locking ring is positioned coaxially around the body and is axially movable between an extended and a retracted position. The locking ring includes an inner cam surface which radially moves the retainers from their outer unlocked position to their inner locked position as the locking ring is moved from its retracted to its extended position.

A conventional fluid seal is carried on the inner bore of the coupling body which fluidly seals the coupling to the fuel tank nipple when the coupling is in its connected position.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a fragmentary exploded view illustrating a preferred embodiment of the present invention;

FIG. 2 is a longitudinal sectional view illustrating a preferred embodiment of the present invention in its unlocked position;

FIG. 3 is a cross sectional view similar to FIG. 2 but illustrating the body in its locked position;

FIG. 4 is a cross sectional view taken substantially along line 4—4 in FIG. 2;

FIG. 5 is a fragmentary cross sectional view taken substantially along line 5—5 in FIG. 3; and FIG. 6 is an exploded view illustrating the preferred embodiment of the present invention.

DETAILED DESCRIPTION OF A PREFERRED EMBODIMENT OF THE PRESENT INVENTION

With reference first to FIGS. 1, 2 and 6, a preferred embodiment of the quick connect coupling 10 of the present invention is thereshown for use in conjunction with a fuel tank 12 of the type used in automotive vehicles. The fuel tank 12 includes an outwardly extending tubular and cylindrical nipple 14 having an outer end 16 and an annular radially inwardly extending recess 18 at a position spaced inwardly from its outer end 16. The nipple 14, furthermore, is adapted for connection with a fill tube 20 (FIG. 1) for filling the fuel tank 12 with fuel.

With reference now to FIGS. 2, 3 and 6, the fluid coupling 10 of the present invention comprises an elongated tubular and cylindrical body 22 having a first end 24 and a second end 26. A plurality of circumferentially spaced elongated slots 28 are formed through the body 22 at a position spaced from its first end 24.

The body 22 at its end 24 has an inside diameter greater than the outside diameter of the fuel tank nipple 14 so that the end 24 of the body 22 is axially slidably received over the nipple 14 and movable from an unconnected position, shown in FIGS. 1 and 2, to a connected position, shown in FIG. 3. In its connected position (FIG. 3) the slots 28 register with the nipple recess 18. An inwardly extending radial abutment surface 30 (FIG. 3) registers with the free end 16 of the nipple 14 and prevents over-insertion of the coupling 10 onto the fuel tank nipple 14.

As best shown in FIG. 3, a resilient O-ring seal 32 is carried within a recess on the inner bore of the coupling body 22. This seal 32 sealingly engages the outer periphery of the fuel tank nipple 14 when the coupling 10 is moved to its connected position (FIG. 3).

With reference to FIGS. 2, 3 and 5, an elongated arcuate retainer 34 is positioned within each of the slots 28 in the coupling body 22. These retainers 34 are movable between a locked position, illustrated in FIG. 3, and an unlocked position, illustrated in FIG. 2. In their locked position (FIG. 3) the retainers 34 are shifted radially inwardly so that a portion of each retainer 34 is positioned within the nipple recess 18. In doing so, the retainers prevent axial movement of the body 22 with respect to the fuel tank nipple 14. Conversely, in their unlocked position (illustrated in FIG. 2) the retainers 34 are shifted radially outwardly from the nipple recess 18 so that the coupling body 22 is axially slidable with respect to the fuel tank nipple 14.

With reference to FIGS. 3 and 5, each retainer 34 has a reduced cross sectional area inner portion which nests in the groove 18, and an enlarged diameter outer portion having a width larger than the width of the slots 28. Furthermore, as shown in FIG. 5, the circumferential ends 50 of each retainer 34 are radially inwardly tapered and the circumferential length of each retainer 34 at its radially outer end is greater than the circumferential length of its associated slot 28. Thus, the retainers 34 can shift radially between their locked and unlocked position while the abutment between the retainer ends 50 and slot 28 together with the enlarged cross sectional area outer portion of each retainer 34 prevents the retainers from passing radially inwardly through their associated slots 28.

In order to move the retainers 34 between their locked and unlocked positions, a tubular and cylindrical locking ring 36 is coaxially positioned around the coupling body 22. The locking ring 36 is movable between a retracted position, illustrated in FIG. 2, and an extended position, illustrated in FIG. 3. The locking ring 36 further includes a cam surface 28 on its inner periphery which cooperates with the retainers 34. Thus, with the locking ring in its extended position (FIG. 3) the cam surface 38 registers with the retainers 34 thus forcing the retainers 34 radially inwardly into the nipple recess 18. Conversely, with the locking ring 36 in its retracted position, the cam surface 38 moves out of registry with the retainers 34 thus allowing the retainers 34 to shift radially outwardly and thus out from the nipple recess 18.

As best shown in FIGS. 2 and 6, a helical compression spring 40 is positioned between an abutment surface 42 on the locking ring 36 and an outwardly extending flange 44 on the coupling body 22. This compression spring 40 thus urges the locking ring 36 towards its extended position (FIG. 3) and thus urges the coupling 10 to its locked position. A locking clip 48 (FIGS. 2 and 6) is secured to the locking ring 36 to retain the locking ring 36 and body 22 together.

In operation, in order to secure the coupling 10 to the nipple 14, the locking ring 36 is first moved to its retracted position (FIG. 2). In doing so, the locking ring cam surface 38 is moved of registration with the retainers 34 thus allowing the retainers 34 to move to their outer unlocked position.

With the locking ring 36 in its retracted position, the coupling body 22 is then slid over the nipple 14 until the retainers 34 register with the nipple recess 18. The locking ring 36 is then released whereupon the spring 40 forces the locking ring 36 to its extending position (FIG. 3) thus forcing the retainers 18 radially inwardly to the locked position and locking the coupling body 22 against axial movement with respect to the nipple 14. Simultaneously, the O-ring 32 fluidly seals the coupling body 22 to the fuel tank nipple 14.

If disconnection of the coupling 10 from the fuel tank nipple 14 is subsequently desired, the locking ring 36 is simply moved to its retracted position (FIG. 2) whereupon the entire coupling 10 can be removed from the fuel tank nipple 14.

In the preferred embodiment of the invention, the body 22, locking ring 36 and retainers 34 are all constructed of plastic. If desired, conductive material can be imbedded in the plastic in order to render the plastic electrically conductive to dissipate static electricity.

Having described my invention, it can be seen that the quick connect coupling of the present invention provides a simple and yet effective means for fluidly connecting the fill tube to the fuel tank in an automotive vehicle.

Having described my invention, however, many modifications thereto will become apparent to those skilled in the art to which it pertains without deviation from the spirit of the invention as defined by the scope of the appended claims.

I claim:

1. A quick connect fluid coupling for use with a fuel tank having an outwardly extending tubular and cylindrical nipple open to an interior of the tank, said nipple having a radially inwardly extending recess at a position spaced from an outer end of said nipple, said fluid coupling comprising:
   a one-piece tubular and cylindrical body open at each end, said body being dimensioned to slidably extend over said nipple to a connected position, said body having a plurality of elongated and circumferentially spaced slots formed radially through said body, said slots registering with said nipple recess when said body is in said connected position,
   a plurality of elongated arcuate retainers, each retainer having two spaced ends, one retainer being positioned in each slot in said body, said retainers being radially movable between an inner locked position in which a portion of said retainers are positioned in said nipple recess thereby locking said body to said nipple, and an outer unlocked position in which said retainers are positioned outside of said nipple recess thereby allowing said body to move axially relative to the nipple,
   a tubular and cylindrical locking ring positioned coaxially around said body and axially movable between an extended and a retracted position, said locking ring having an inner cam surface which radially moves said retainers from said unlocked position to said locked position as said locking ring moves from said retracted to said extended position, said ring being freely slidable between said extended and said retracted position to enable selective engagement and disengagement of the coupling with the fuel tank,
   means for resiliently urging said locking ring towards said extended position, and
   means for fluidly sealing said body to said nipple when said body is in said connected position, wherein said body, said retainers and said locking ring are constructed of plastic, and
   wherein each end of each retainer is curvalinearly formed so that, when viewed axially with respect to an axis of the body, each end of each retainer is generally S-shaped with a radially outer portion of each retainer having a greater circumferential length than a radially inner portion of each retainer.

2. The invention as defined in claim 1 wherein said resilient means comprises a helical spring disposed around said fill tube, said spring having one end in abutment with said retainer housing and a second end in abutment with a spring retainer on said fill tube.

3. The invention as defined in claim 1 wherein said body has a radially inwardly extending abutment surface from an inner bore of said body at a midpoint of said body, said abutment surface registering with an end of said nipple to limit the insertion of said body over said nipple.

4. The invention as defined in claim 1 wherein each retainer includes a reduced cross sectional area inner portion and an enlarged cross sectional area outer portion.

5. The invention as defined in claim 1 wherein said sealing means comprises a resilient O-ring carried on an inner bore of said body.

* * * * *